(12) United States Patent
Jackson et al.

(10) Patent No.: US 12,347,036 B2
(45) Date of Patent: Jul. 1, 2025

(54) PICKING AND PLACEMENT PROCESSES USING AN AR HEADSET

(71) Applicant: Instalink, LLC, Sandy, UT (US)

(72) Inventors: Charles Jackson, Sandy, UT (US); David Childs, Riverton, UT (US)

(73) Assignee: Instalink, LLC, Sandy, UT (US)

( * ) Notice: Subject to any disclaimer, the term of this patent is extended or adjusted under 35 U.S.C. 154(b) by 171 days.

(21) Appl. No.: 18/303,489

(22) Filed: Apr. 19, 2023

(65) Prior Publication Data

US 2024/0355057 A1  Oct. 24, 2024

(51) Int. Cl.
*G06T 19/00* (2011.01)
*G06K 7/10* (2006.01)
*G06K 7/14* (2006.01)

(52) U.S. Cl.
CPC ........ *G06T 19/003* (2013.01); *G06K 7/10396* (2013.01); *G06K 7/1417* (2013.01); *G06T 19/006* (2013.01)

(58) Field of Classification Search
None
See application file for complete search history.

(56) References Cited

U.S. PATENT DOCUMENTS

| 11,783,400 B1 * | 10/2023 | Schack | G06Q 30/0643 |
| | | | 705/26.7 |
| 2019/0294841 A1 * | 9/2019 | Hall | G06Q 10/08 |
| 2024/0425281 A1 * | 12/2024 | Peterson | G05D 1/2446 |

\* cited by examiner

*Primary Examiner* — Robert J Craddock
(74) *Attorney, Agent, or Firm* — Thorpe North & Western, LLP.

(57) ABSTRACT

Technology is described for picking or placing items within a storage area using an AR headset. One method may include scanning an optical code on a mobile storage cart to determine a position and orientation of the mobile storage cart. Item data may be retrieved for an item to be retrieved from a storage location in the storage area and placed on the mobile storage cart. A first graphical guidance indicator can be provided to guide a user of the AR headset to the storage location of the item to be picked. An optical code on the item may also be scanned. A placement indicator may be displayed and overlaid on a storage bin on the mobile storage cart representing a location where the item is to be placed.

20 Claims, 9 Drawing Sheets

PICKING AND PLACEMENT PROCESSES USING AN AR HEADSET

BACKGROUND

Mixed reality or augmented reality is an area of computing technology where images from the physical world and virtual computing worlds may be combined into a mixed reality world viewable or accessible to a user. In mixed reality, people, places, and objects from the physical and virtual worlds become a blended environment. A mixed reality experience may be provided through existing commercial or custom software along with the use of VR (virtual reality) or AR (augmented reality) headsets.

Augmented reality (AR) is an example of mixed reality where a live direct view (e.g. a real-world view through lenses) or an indirect view (e.g., through a camera) of a physical, real-world environment is augmented or supplemented by computer-generated sensory input such as sound, video, graphics, haptic feedback, smell or other sensory data. Augmentation is performed as a real-world location is viewed and in context with real environmental elements. With the help of advanced AR technology (e.g. adding computer vision and object recognition) the information about the surrounding real world of the user may become interactive and may be digitally modified.

One issue faced by AR systems or AR headsets is aligning the position of a virtual element with a physical object in a live view of a real-world environment. The alignment resolution of an AR headset may be able to align a virtual object to a physical object being viewed but the alignment resolution may only be aligned to within a few centimeters. Providing alignment to within a few centimeters may be useful for entertainment, games and less demanding applications but greater positioning and alignment resolution for AR systems may be desired in the scientific, engineering, medical and other disciplines desiring greater precision.

Another issue faced by AR headsets is that they are generally battery powered for the AR headsets to be useful in scientific, engineering, medical or industrial applications. For example, a battery powered AR headset may last up to 3 hours if an average amount of use and workload is placed on the AR headset, but an AR headset may take an hour to charge. However, if heavy use is performed with the AR headset, then the batteries of the AR headset may be used up more quickly. Software and methodologies that assist an AR headset with conserving power while still enabling completion of the work load with the AR headset can be valuable.

DETAILED DESCRIPTION

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

The present technology may enable a user to scan an optical code on an item or product using an augmented reality (AR) headset. The scanning may be used in the process of picking items from storage or placing items or product for an electronic commerce retailer and/or in warehouse storage. Optical codes may be located on items or products that are being retrieved by a user from a warehouse or storage location for shipping or other purposes. Scanning an optical code with the AR headset also enables an inventory management system to record what is being picked from the warehouse or what is being placed in the warehouse. The optical code may be at least one of: a one-dimensional bar code, a linear bar code, a 2D bar code (e.g., a QR Code®, a Data Matrix®, a Maxicode, PDF-417®, a 16K Code®, a 49 Code®, an Aztec Code®, an SP Code®, a Veri Code®, or a CP Code®), a sequence code or any other optical code on an item or product.

A scanning application on the AR headset may be able to track a user's hands and the positioning of the user's hands by tracking a user's wrist or arm. In the present technology, a scanning application may be able to use an AR headset's ability to be able to track where a user's wrist is located and this determines at focal depth for which scanning can take place. Further, this technology enables scanning of the optical codes to occur regardless of whether the user's fingers are visible or not by tracking a user's wrist or arm.

A scanning application in the AR headset may track an eye gaze of a user using the AR headset eye tracking functionality to identify an eye gaze location. The AR headset can include eye gaze tracking hardware and software in the AR headset. For example, the Microsoft® Hololens® may provide gaze tracking and head position tracking. Other previously existing AR or VR headsets may also provide such functionality. Tracking the eye gaze of the user using the AR headset may identify the eye gaze location based on the user's view through the waveguides or lenses of the AR headset. As a result, a reticle or scan area located around the eye gaze location can be defined, and the reticle can be an area where the AR headset scans for optical codes. This reticle can be defined in images or video from a visual camera that is capturing what the user is seeing and can be used to scan optical codes in the reticle.

A scan area of an optical camera of the AR headset may be set or limited based in part on the reticle or a scan area may be defined around the eye gaze location. In one example, a scan area or geometric area may be defined starting at or surrounding the gaze point (e.g., centered on the gaze point), and the AR headset may use the scan area to actively scan for optical codes. This scan area may be rectangular, square, oval, round, elliptical, pentagonal, hexagonal, octagonal, irregular or another shaped area. Because the scanning for an optical code is reduced to the scan area as compared to the entire view area, this decreases the amount of processing needed to be done by the AR headset and improves the speed of the overall scanning process. AR headsets are often battery powered and reducing the size of the scan area that is processed when detecting the optical codes can improve the battery life of the AR headset.

Figure 1:
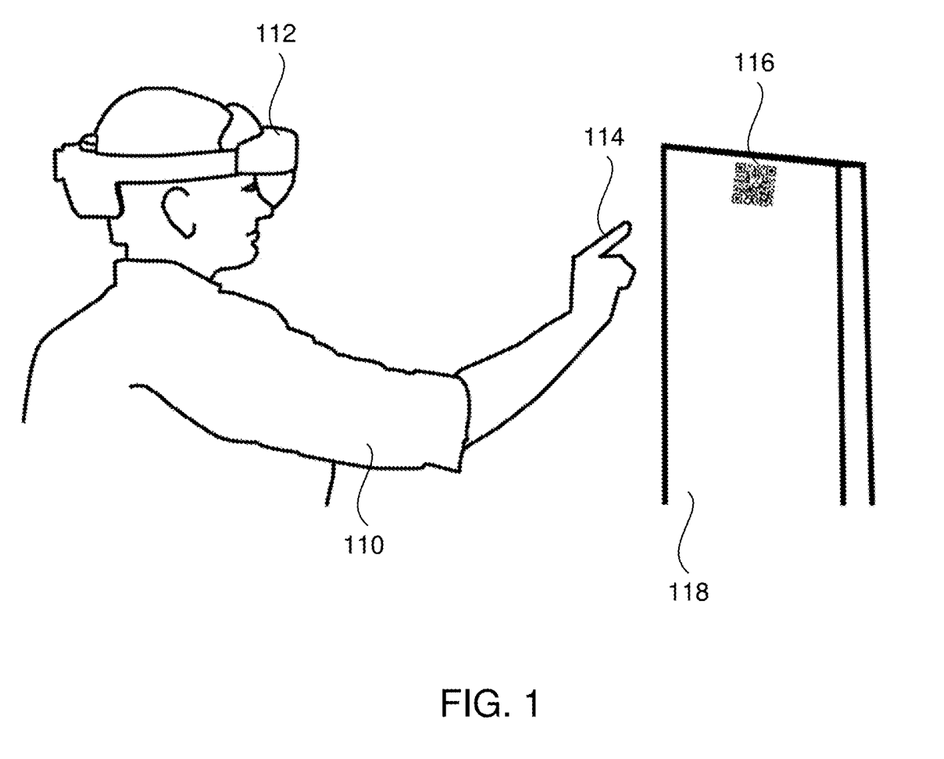
FIG. 1 illustrates an example of a user operating an AR headset to scan an optical code.

FIG. 1 illustrates a user 110 operating an AR headset 112 to identify and scan an optical code. In one configuration, a finger 114 that is a single pointer finger or index finger of the hand in a pointing pose may be detected. The system may be configured to detect this finger pose or another pointing pose which can be used as a pointer indicator for scanning. The user may point at an optical code 116 and the scanning application on the AR headset 112 may be configured to scan for an optical code at or near the tip of the finger or in a scan area defined by the tip of the finger. The scan area at the tip of the finger may be any shape.

For example, a user may have a large item 118 or box in front of them which may be difficult to pick up or may be too large to pick up. The user may then point at the location on the large item 118 or box where the optical code is located and then the scanning application and AR headset may scan the bar code. An optical code in proximity to a distal end of the finger 114 may be scanned as directed by the user. This pointer finger aspect may be turned on or off using a graphical user interface or a spoken command. More specifically, the scanning application may first detect a hand and then the hand position to see if the index finger or a pointing finger is extended. When a pointing finger (e.g., index finger, middle finger or long finger, ring finger, little finger), thumb or a group of fingers is extended, then the scanning may occur at the tip of the finger or group of fingers. In one example, the scanning may occur at any finger that is extended alone. In another configuration, two fingers extended together in a pointing position may also be used. This user interface indicator to start the optical code scanning using the user's finger(s) may be valuable because a user may not be able to lift a box to allow the AR headset to focus on the optical code on the item.

In this pointing and scanning configuration, the optical camera of the AR headset may be set at the focus depth of the finger 114 of the user 110 to enable scanning of the optical code 116 near the depth of the finger 114. Since the finger 114 (e.g. index finger) may be used to guide the scanning of optical codes, the focus depth of the camera may be set to the depth of a finger that is detected by the AR headset and/or scanning application.

Figure 2:
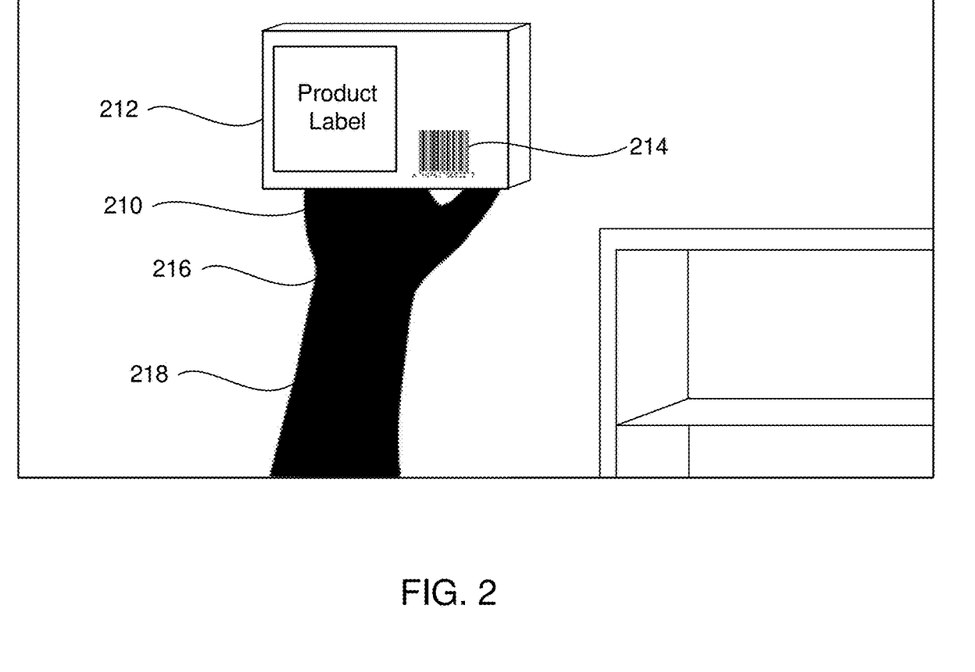
FIG. 2 illustrates an example of an AR headset that can detect a depth of a hand, wrist or arm of a user in proximity to a product item.

FIG. 2 illustrates an example of an AR headset that can also detect a depth of a hand 210 of a user in proximity to a product item 212. For example, the hand 210 may be holding or lifting the item 212. The depth of the hand 210 can be detected with sensors in the AR headset. For example, the sensors may be at least one of: a time-of-flight depth sensing camera using a modulated light source, an infrared depth sensing camera, visible cameras that use triangulation, an ultrasound sensor, sonar, LIDAR (light detection and ranging) or another depth sensor which can detect the depth of an object from the AR headset.

In one example configuration, detecting the depth of the hand 210 may fail due to the fingers not being visible and the fingers may be hidden behind an item 212 being held. As a result, a wrist 216 of the user may be detected using the scanning application on the AR headset. More specifically, the wrist 216 may be used for detection of a scanning depth when at least one digit or a palm of the user's hand 210 is obscured by the item 212 being held by the hand 210. Identifying the wrist 216 and/or part of the arm 218 in scanning may be used to set the focus. The focal depth of the optical camera may be set to a detected depth of the hand 210, wrist 216 or arm 218 of the user from the AR headset. Unless the correct focus is obtained, a scan of the optical code 214 may fail. In other words, the optical camera may not know where to focus and the optical code 214 of an item 212 may be out of focus and unscannable. Accordingly, the optical code 214 may be scanned using a correct focal depth and scan area of what the user is looking at in the AR headset based on a portion of the hand 210, wrist 216 or arm 218 of the user detected by the AR headset.

Once the focus depth and scan area are set, then an optical code 214 from the item 212 may be scanned using the optical camera set at the focus depth. The item 212 may be registered by the AR headset as being held by the user. If the user is in picking mode, then the AR headset can report to the inventory management system that the item has been picked and can be shipped to a purchaser. In addition, the inventory management system may reduce its count of the inventory so that a correct count of the inventory is immediately known. Similarly, if the user is in placing inventory mode, the inventory can be increased for an inventory item that is placed in storage or in a warehouse.

The scanning application on the AR headset may be able to determine that a location of the AR headset is a location of the user in a warehouse. This may allow the AR headset to guide a user around the warehouse. Since the AR headset knows where the user is located in the warehouse, the optical scanning may be enabled when the user and AR headset are in an area of the warehouse where one or more items to be scanned are known to be located. For example, if one item is to be picked, then optical code scanning may be enabled when the AR headset is known to be in proximity to the item. Alternatively, the scanning of items may be enabled when the user is in a certain area of the warehouse. For example, scanning may be turned on when the user with the AR headset enters the automobile parts section of the warehouse and turned off when the user exits that area.

In another example, the location of the user with the AR headset may be determined and the scanning application on the AR headset may determine whether the user is at a picking location or a placing location. If the user is at the picking or placing location, then the optical scanning may be enabled when the user and the AR headset are at the defined picking or placing location for picking or placing the item. This enabling of scanning may occur at a specific storage shelf, storage row, storage zone, etc.

The scanning application may also determine that the location of the user with the AR headset is not a picking location or a placing location. This where the user is not located where picking or placing can take place (e.g., a shelf, row, zone, etc.) but may rather be walking through corridors, putting items in packaging, etc. As a result, the optical code scanning may be disabled when the user and AR headset are not in a location for picking the product item or placing the product item. This saves processing power in the AR headset and can save battery power because the AR headset only performs scanning in locations where the scanning function may actually find an optical code.

Figure 3:
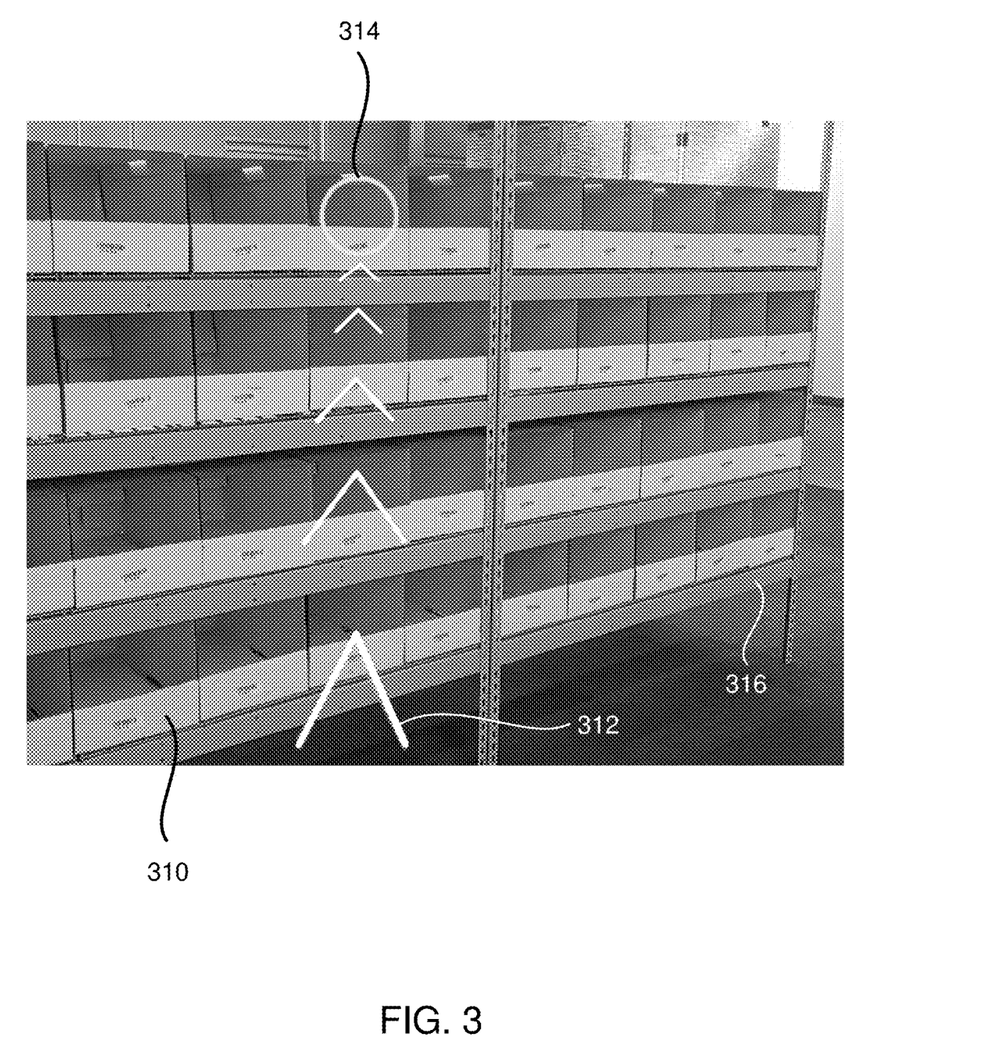
FIG. 3 illustrates an example of guiding a user to move to or from picking and placing locations.

FIG. 3 illustrates that the scanning application on the AR headset can also be used to guide a user when the user is working with storage bins 310, storage shelves 316, mobile storage carts and similar picking and placing locations. For example, the scanning application can guide the user, using graphical arrows 312, to a location where the item is to be stored in a storage location such as a storage bin 310 or storage shelf 316. Similarly, the scanning application can guide the user, using graphical arrows 312, to a location where an item is to be stored on a mobile storage cart. FIG. 3 further illustrates that a target marker 314 or placement indicator may also be provided to show an exact bin, shelf or location where an item is to be stored or a location from where an item is to be retrieved. The target marker 314 may be a graphical overlay created by the AR headset. For example, the target marker 314 may appear as though it is on the bottom of the storage bin, in the front of the storage bin or otherwise at a position to designate the storage location.

Figure 4:
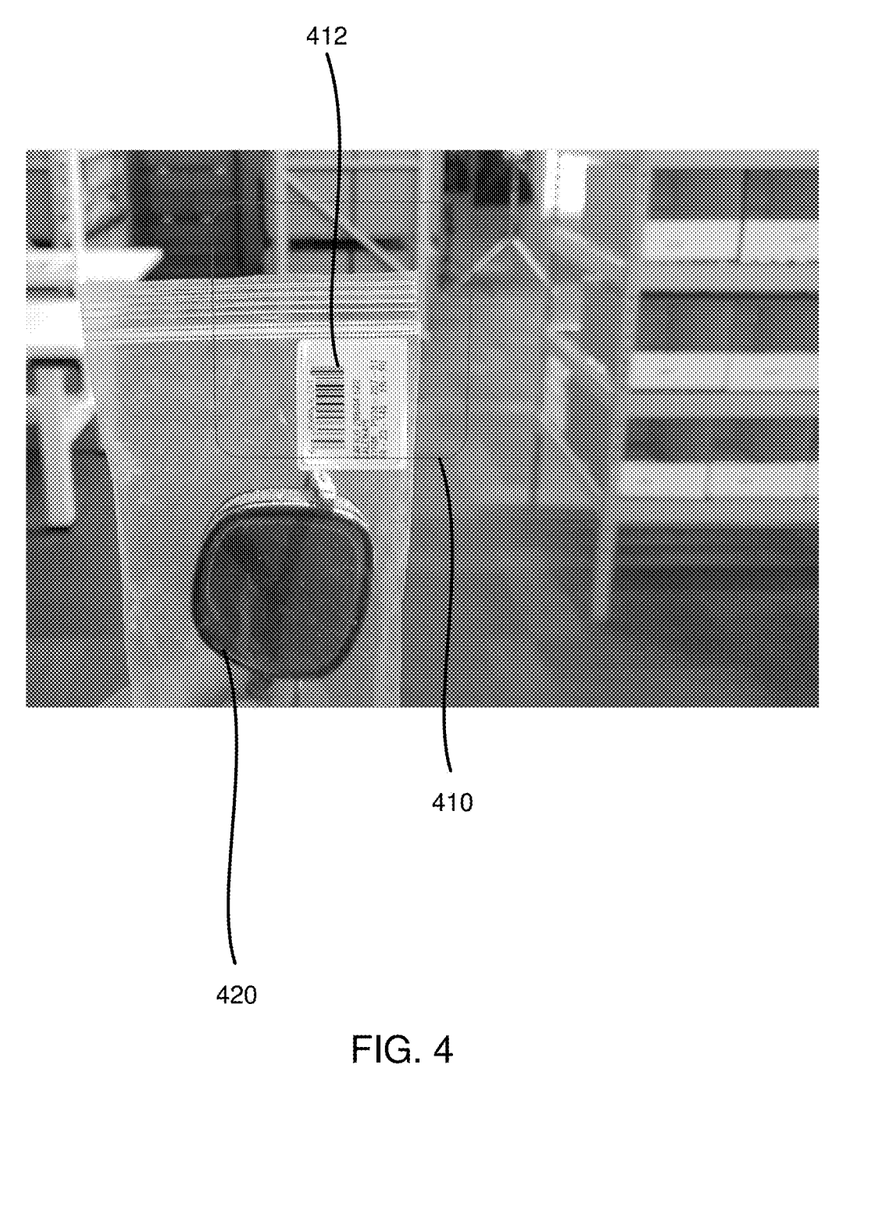
FIG. 4 illustrates an example of a scanning application on the AR headset generating a reticle or cursor in the area of a user's vision.

FIG. 4 illustrates that the scanning application on the AR headset may generate a reticle 410 or cursor defining a scan area in the area of a user's vision. The reticle 410 can be generated based in part on the position of the user's gaze location (i.e., where the eye is actually looking) and the distance of the user's hand or wrist (not shown in FIG. 4). The reticle 410 or the user's hand may turn red when the user's hand is too far away to accurately focus on. Similarly, the reticle 410 and/or the user's hand can turn grey when the user's hand is at a good distance for scanning. The detection of the user's hand may include detecting the user's wrist and the AR headset can be set to scan items or focus at the distance of the user's wrist. Focusing on the wrist is useful because the user's fingers may often be obscured by the item being picked up.

When the user is holding an object or item 420 with an optical code 412 (such as a bar code, for example) on the item 420, the reticle 410 can turn green and the scanning application on the AR headset can scan the optical code 412 of the item. As described, once the scanning application has determined what item 420 has been scanned, then arrows may pop-up and instruct the user where to place the item as shown in FIG. 3. For example, the user may be directed by arrows and a placement indicator to place an item on a storage shelf, on a mobile storage cart or in a bin in either type of location. For example, the target marker may be any shape that is presented by the AR headset, and the user can put their hand at or through the geometric shape and this way the AR headset knows the user has placed the item in the directed location. For example, the geometric shape of the target marker may be a 1D shape, 2D shape or 3D shape including, for example, at least one of a line, a ring, a square, a triangle, a box, a pyramid, pentagon, hexagon, an octagon, etc. representing a target location where an item may be placed or picked from.

Figure 5:
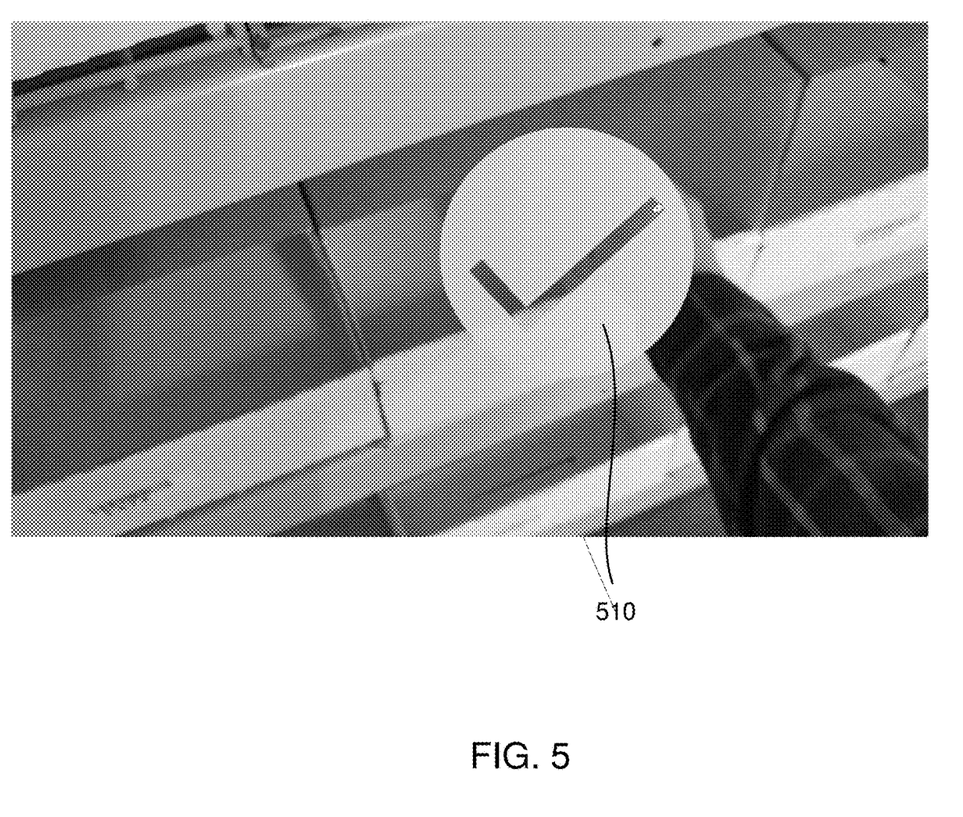
FIG. 5 illustrates an example a graphical confirmation when the user's hand has passed through a location or arrived at the correct placement.

FIG. 5 illustrates that when the user's hand has passed through or arrived at the geometric shape, then the geometric shape may change color or shape to indicate placement of the item. For example, the geometric shape may change to a mark 510 (such as a checkmark) or may add a mark in the geometric shape representing a correct placement of the item. The color of the mark may indicate that success has been achieved. Any color may be used for the mark but colors that users may respond well to are green, blue, purple, gold and/or other colors that represent success or item completion in most other types of graphical user interfaces. Any type of success marker or icon can be used in this case. For example, the success icon may be a smiley face, a thumbs-up, a green filled circle, an animal or an image that indicates success.

In another example, the AR headset may send the user to a specific spot in a warehouse using guidance arrows. When the user arrives at the correct location, the user can place the items that are to be stored at the location. The AR headset may track the user's hand as arriving at the location or passing through geometric shapes, such as circles for each item that is put away. In one example, there may be a circle in front of a bin or the circle may be overlaid on the bin to appear as though the geometric shape is in the bin. Thus, the user may place items in a warehouse using this process.

In a further example, the AR headset may also be used for picking items from a storage location, storage bin, mobile storage cart or the like in a warehouse. In one example, the user can point the AR headset toward two markers (e.g., optical codes) on the mobile storage cart, and the cart can be registered with the AR headset through scanning the two markers. The user can then select a virtual button visible through the AR headset to start the picking process for the mobile storage cart.

The scanning application on the AR headset may direct the user to a first location to pick an item, and the user can move the cart to the first location (e.g. usually by rolling the cart on its wheels). From the first location, the user may view an arrow that directs the user to pick up an item from a storage location. The user may also receive a quantity of the items to pick at that storage location. For example, the scanning application may instruct the user to retrieve three of the items from the same location.

The user can scan the optical codes on the items picked (e.g., three items). Next, the arrows may direct the user to one or more bins on the mobile storage cart to place the items picked. The AR headset may present one or more graphical target markers (e.g., a placement indicator) on one or more bins in which the picked items are to be placed. An example of the target markers or graphical highlighting may be a geometric shape referencing a bin in which to place the items. The graphical highlight or graphical geometric object (i.e., a virtual object) generated by the AR headset may be displayed in a perspective form so that the graphical geometric object appears as though the target marker is in the bin. The user may put the three items that were picked into the bin.

The user may have a list of items to be picked for several orders and the AR headset may direct the user to those items. When the items are picked, the user may move onto the next location as directed by the AR headset. The path in the warehouse traveled by the user doing the picking may be set to be an efficient path based on the list of items to be picked in one or more orders.

Figure 6:
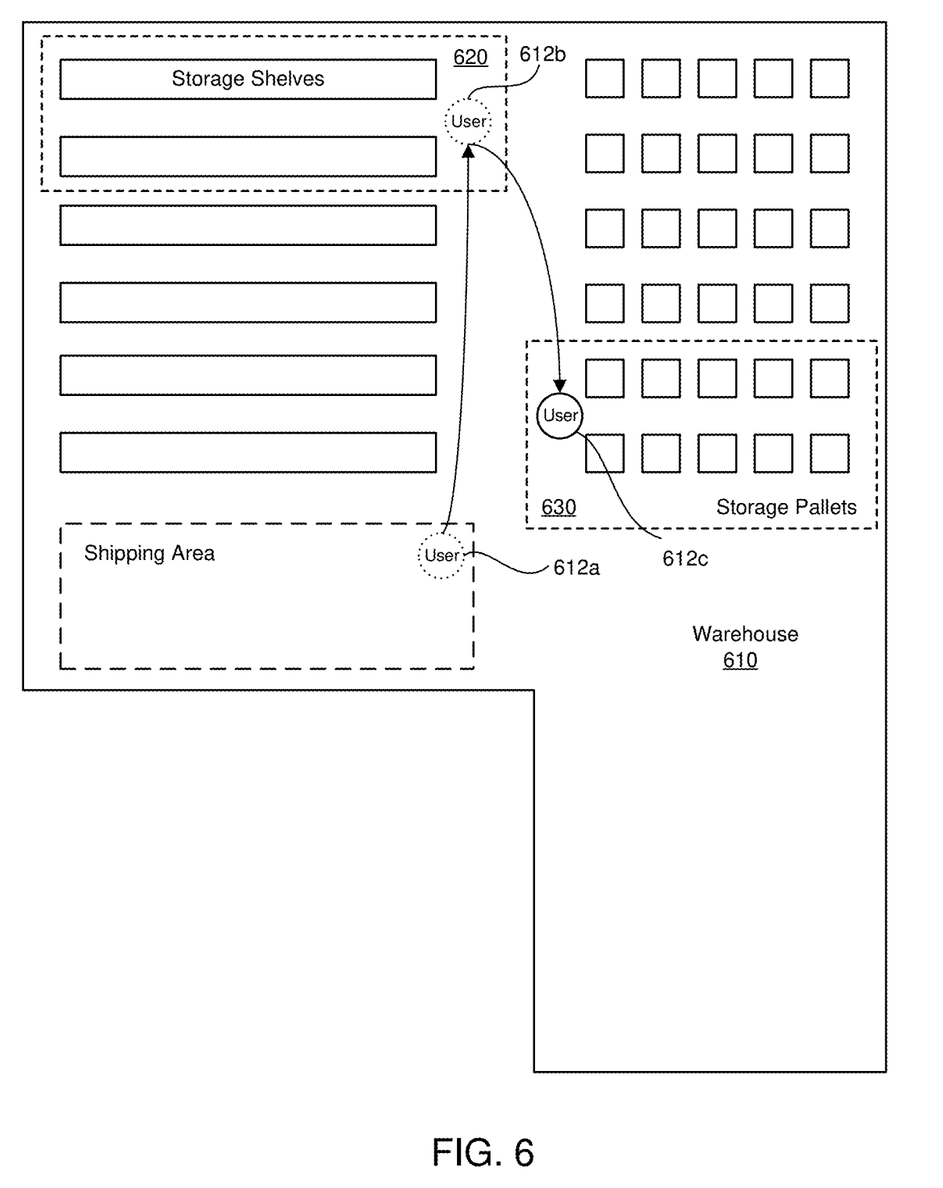
FIG. 6 is block diagram illustrating an example of enabling or disabling the scanning on the AR headset depending on a position of the AR headset.

FIG. 6 further illustrates that the scanning using the AR headset may be enabled or disabled depending on a position of the AR headset in an area such as a warehouse 610. In this configuration, the AR headset may not scan anything until the user is at the appropriate location. More specifically, the scanning process of the AR headset may not be activated until the user arrives at the scanning location. For example, a user may be located at 612a in a shipping area and the AR headset scanning may be disabled at this point. The user may receive an assignment for picking a list of items for orders to be shipped. The user may move to a second location at 612b in the warehouse, so the user is located in a particular portion of the storage shelves 620 (the particular portion of the storage shelves 620 being outlined by dotted lines in FIG. 6). The scanning function for the AR headset may be enabled to scan for optical codes when the user is in the correct picking or placing area (e.g., the storage shelves in this case). This means if the user is at the picking location or putting away items at a location, then scanning can be enabled and the AR headset may scan a reticle area or scan area in the AR headset to find optical codes that should be scanned.

As an additional part of this example above, the user may move from scanning in storage shelves 620 and to scanning in a third location 612*c* near storage pallets 630. The scanning function may be disabled as the user moves from area to area, and the scanning may be re-enabled when the user enters the area defined for the storage pallets 630. In an additional configuration, handheld scanning may be enabled in the storage shelves 620 but only finger pointing scanning may be enabled in the storage pallets 630 due the nature of the product packaging. Activating or deactivating scanning at the appropriate locations can save battery life on the AR headset, save processing power, reduce heat generated by the AR headset, make the scanning application run more efficiently, avoid inadvertently scanned items, and provide similar benefits.

The processes just described may relate to a picking process but another process may also be used for putting items on the shelf and/or sorting items. In one example, a warehouse owner may prepare a pre-sort return wall with many bins of sorted returned products (e.g., types of sunglasses). A user may be tasked with taking pre-sorted returned items back to a storage aisle or storage area in the warehouse where the items belong. A warehouse owner might lose money on returning individual small value items back into the warehouse on a one-by-one basis because a person is being paid an hourly wage to return those items individually. For instance, if the warehouse is a quarter mile long, even the amount of time for an individual to cross the warehouse is expensive. In order to save on these costs, the warehouse owner may use the scanning application and AR headset to assist with pre-sorting the items by: return to stock items, return to manufacture items, clean-up items, throw away items, high or low value as identified for each item. The AR headset can provide the strategic sorting to reduce the amount of return work and costs. Items grouped by location can be returned to their storage locations and grouping the item returns saves on the item placement costs.

Figure 7:
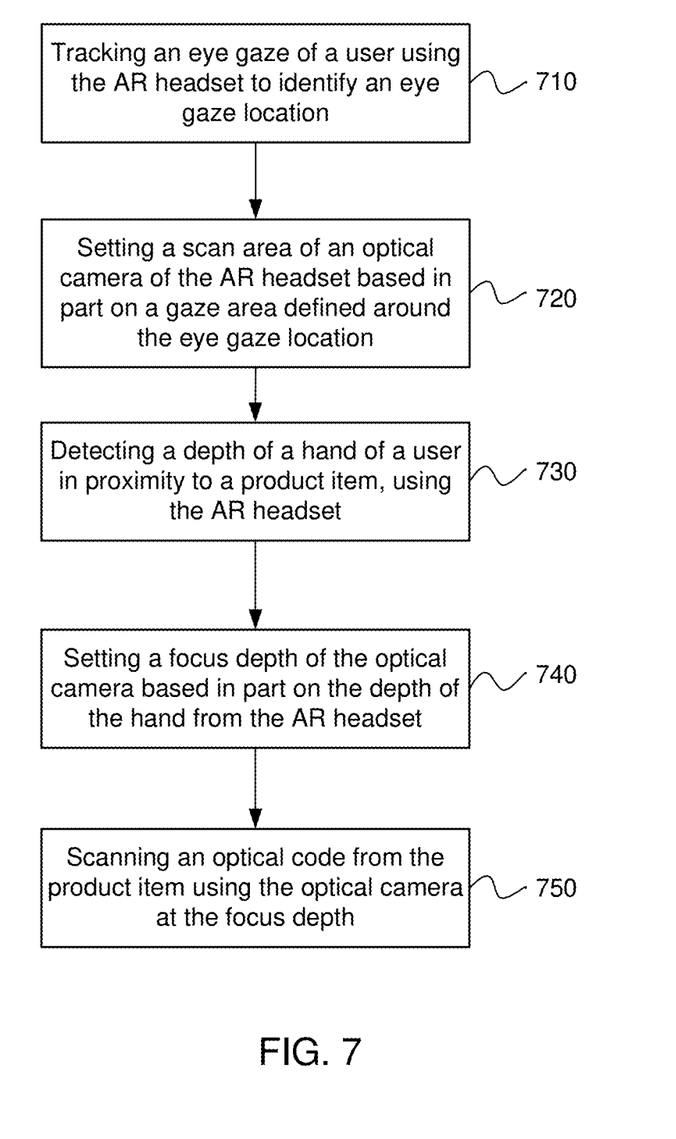
FIG. 7 is a flow chart illustrating an example method of scanning an optical code using an augmented reality (AR) headset.

The scanning application may use the combination of the eye gaze with the reticle and the wrist identification to find optical codes (e.g., bar codes on products). FIG. 7 illustrates a method of scanning an optical code using an augmented reality (AR) headset. An initial operation may be tracking an eye gaze of a user using the AR headset to identify an eye gaze location, as in block 710.

A scan area of an optical camera of the AR headset may be based in part on a gaze area defined around the eye gaze location, as in block 720. A reticle can be generated around the user's eye gaze and the reticle can be set as the location where the AR headset is going to perform scanning. For example, a gaze location that is being looked at can be identified and then a rectangle or square can be formed around that view location and the box may be a specific number of pixels, pels, centimeters, inches or another measurement offset from and/or surrounding the gaze location or view point.

Another operation may be detecting a depth of a hand of a user in proximity to an item with respect to the AR headset, as in block 730. In the situation where a user's fingers and/or thumb are covered by product packaging, then the user's wrist or arm can be identified and tracked. Tracking the wrist is valuable because a user's fingers may be behind the item. The AR headset software (e.g., on the Microsoft® Hololens®) may track the hand, but if the hand is not visible then the present technology may identify the user's wrist or arm.

A focus depth of the optical camera may be set based in part on the depth of the hand from the AR headset, as in block 740. In one example, the detected hand, wrist or arm may then be used to determine the distance at which a camera focus can be set and the distance the AR headset should scan for the optical codes. The AR headset may track the location and depth of the hand, wrist or arm using an optical sensor (e.g., a camera) and near field imagery that is captured optically. In addition, the location and depth of the wrist may be tracked using a time-of-flight depth sensor or an infrared camera system. For example, the focal distance of the camera may be set to the same distance as the wrists current distance from the AR headset. The reticle generated around the user's gaze can be set as the focus area for scanning.

Once the focus depth or focal distance is set, then scanning an optical code from the item using the optical camera at the focus depth may occur, as in block 750. If the AR headset is not able to scan the optical code, a finger may be used to direct the location to start scanning. This allows a user to hold an item and then point at the item with the other hand. The one finger identification may be considered a pointing gesture. This is possible because using the AR headset frees both hands for such actions. More specifically, when wearing an AR headset, one of user's hands is not occupied with a separate hand carried scanner. Users that apply a hand scanner only have one hand available at a time to manipulate products. This technology and use of the AR headset allow a user to do more things with both hands when picking and placing.

The present technology can be used to inform the AR headset regarding where to scan by using the reticle or finger pointing. Otherwise, scanning of the entire field of view of the AR headset constantly makes the scanning application slow and less responsive. The auto focus of the camera in the AR headset can focus in on items that are viewed but the autofocus function is not able to identify objects that are important or unimportant. In contrast, cell phone cameras have a very small field of view (FOV) when scanning an optical code. When a user scans an optical code using a cell phone, the user can move the phone physically closer to the optical code (e.g., create a physical zoom). This physical zooming identifies what is important by cutting other objects out of the cell phone's camera view. A cell phone camera is not generally able to scan an optical code if the camera is moved back and away from the optical code. An AR headset has a large FOV. If the entire FOV is scanned all the time, then the optical scanning does not work effectively. It may take 30 seconds to scan the whole field of view and this is generally unworkable for picking and placing tasks. With the improvements of the present technology that set the focal depth and the scan area, the scanning can be as fast as a hand scanner or faster than hand scanners for optical codes.

One problem with picking and placing product in a warehouse is that every product or item in the warehouse has a barcode and needs to be scanned at some point. However, there is no uniformity to the packaging or the products. In addition, the size of the products and shape of the packaging may vary as uniquely as the products themselves. Even the locations of the products and the storage bins they may be stored in are not necessarily uniform. Some products may be stored on a pallet, in a bin, on a shelf or simply on the floor of a building. The packaging may be made of any type of material and may have any type of cover, which may include: plastic bags, shrink wrap, matte boxes, reflective boxes, paper boxes, metal containers, plastic containers, no packaging, and so on. This technology provides the ability to effectively scan items for any picking and placing operations performed by a user in a warehouse.

In order to register a position of a mobile storage cart in a coordinate system of the AR headset, two optical codes on the mobile storage cart can be scanned. Scanning these two optical codes can identify a distance of the cart from the AR headset and also the orientation of the cart. The AR headset can compute the distance of the AR headset (and user) to the cart using triangulation and/or the depth sensors of the AR headset. The AR headset may also know that there are placement target locations inside storage bins or boxes on the mobile storage cart at fixed locations. The optical codes may be used on the cart to allow the AR headset can identify the location and orientation of the cart and then indirectly identify the location of the bins or shelves on the cart.

For the AR headset to navigate in the warehouse, the AR headsets may have a 3D digital map of the warehouse space and the AR headset knows where the AR headset is in the warehouse space by viewing objects in the space and doing pattern recognition comparisons to the 3D digital map (or virtual 3D map) to determine where the user is in the warehouse space.

This present technology does not use QR codes on the shelves or "way posts" to navigate the warehouse space. Some previously existing AR systems (e.g., Google glasses or other AR headset) have scanned codes posted in a warehouse or storage area to tell the user where the AR device is in the warehouse.

The use of a 3D digital map in the AR headset will be described in more detail now. The 3D digital map of the warehouse space may be created and then stored in the AR headset. The anchor point for the 3D digital map which matches or correlates a real-world point and a virtual world point is recorded by AR headset. This is set up one time for a single AR headset and then all the headsets in a warehouse can use this same map and reference point. Essentially, all the headsets can share the 3D spatial map with each other.

A CAD (computer aided design) tool or similar modeling tool may have been used to create the 3D digital map of the warehouse (e.g., a 3D model of the inside of the warehouse). The locations that a user may be instructed to visit are in the 3D digital map of the warehouse (along with a navigation network mesh). Each product in the warehouse may have a location (e.g., location A) assigned to the product using a warehouse management system. The AR headset may know where the location is in the 3D digital model. The 3D digital model of the warehouse with a navigation mesh does not have information about the products but only locations. Thus, the 3D digital model does not know what is in a location, the 3D digital model only knows a location name. However, the location name for each item can be retrieved from a warehouse management system and/or a separate product location data store or product location linkage table. The AR headset can navigate to the location using the 3D digital model of the warehouse stored in the AR headset once the item location is known. The headset knows where to go based on the 3D digital model with a navigation mesh and based on the location looked up for the desired products in the 3D digital model. If the warehouse management system reports that a product is at location X, then the AR headset can direct the user to location X using the navigation mesh without knowing what is at that location specifically.

The AR headset can store a 3D digital map or virtual map of the space. This map may keep track of the navigation mesh that is overlaid on the virtual map. The virtual map is a reference for the navigation mesh. The AR headset knows where locations and warehouse objects (e.g., shelving, other AR headsets, furniture, machinery, etc.) are in the warehouse space using the 3D digital model or virtual map. The AR headset may determine where a user is located based on the location of their AR headset in the warehouse.

As mentioned, the alignment of the virtual map to the real-world warehouse space may be pre-programmed. Once the 3D digital model with the navigation mesh has been built, then a reference point is added to the 3D digital model or virtual map. It does not matter where the point is in the navigation mesh and the real world. The virtual map is then lined up with the actual space by showing the AR headset where that exact point is in the real world. Any additional error offset between the virtual map and the real-world anchor is determined and the points are lined up with any needed error correction. Once alignment has taken place, the real-world spatial anchor and virtual spatial anchor may remain the same after that point. The 3D digital model or virtual map may be updated as much as desired after that point, as long as the alignment points or spatial anchors remain the same. The virtual map can be shared between each AR headset, and the system can track whether the AR headset is in the same space.

Without the 3D digital model or spatial map stored in the AR headset, the user would have look at the item and scan the item and look at the bin and scan the bin upon placing or picking from a bin. In addition, the user would have to scan optical codes in the warehouse at certain way points. Scanning to identify navigation locations and scanning way points is much slower than embedded navigation.

In one picking example, a user may obtain a mobile storage cart that is identified by scanning the mobile storage cart. Then the AR headset may obtain a list of items needed to be picked and stored in the mobile storage cart. In example order 1, a spiral bound notebook may be in that order. The system looks up the location for spiral bound notebook, which is location Z. Then the AR headset references the navigation mesh and finds point Z and the AR headset navigates the user to that point in the navigation mesh. The warehouse management system does not know that location Z is at a coordinate 45 meters from wall A and 6 meters down an aisle but the navigational mesh does. This way the AR headset does not need to keep track of a product location but the product location is retrieved from the warehouse management system. The warehouse management system may be executing on an on-premises server or in a cloud storage system.

If the cart moves, the user will have re-scan the two codes on the mobile storage cart to figure out the cart location. Alternatively, the mobile storage cart may have LIDAR, AR headset technology as described herein, or a location finder on the cart, and such detection sensor(s) could help maintain the location of the cart. The present technology places the object in the space using the 3D digital model and navigation mesh and the AR headset also has knowledge of objects in the real-world space. This way the AR headset always knows the AR headset's own location. The AR headsets location can be marked in the 3D coordinate system and shared with other AR headsets in the warehouse space. Mobile storage carts can also track their own location using the same technology, if desired.

Some warehouse navigation systems have used Google Glass™ for navigating in the warehouse. However, Google Glass™ is just a heads-up display for a client that does not have knowledge of the warehouse space. For example, a user can look at a code and the Google Glass™ will scan the code and tell the user which direction to go and to what aisle after referencing a database. Google Glass™ has to scan a QR code or optical so the system will know the user's current location and then system can route the user to the correct location. This is because the heads-up display does not know a user's location at any given point in time, and Google Glass™ can only provide routing from one known point to another using a map stored at a server.

Figure 8:
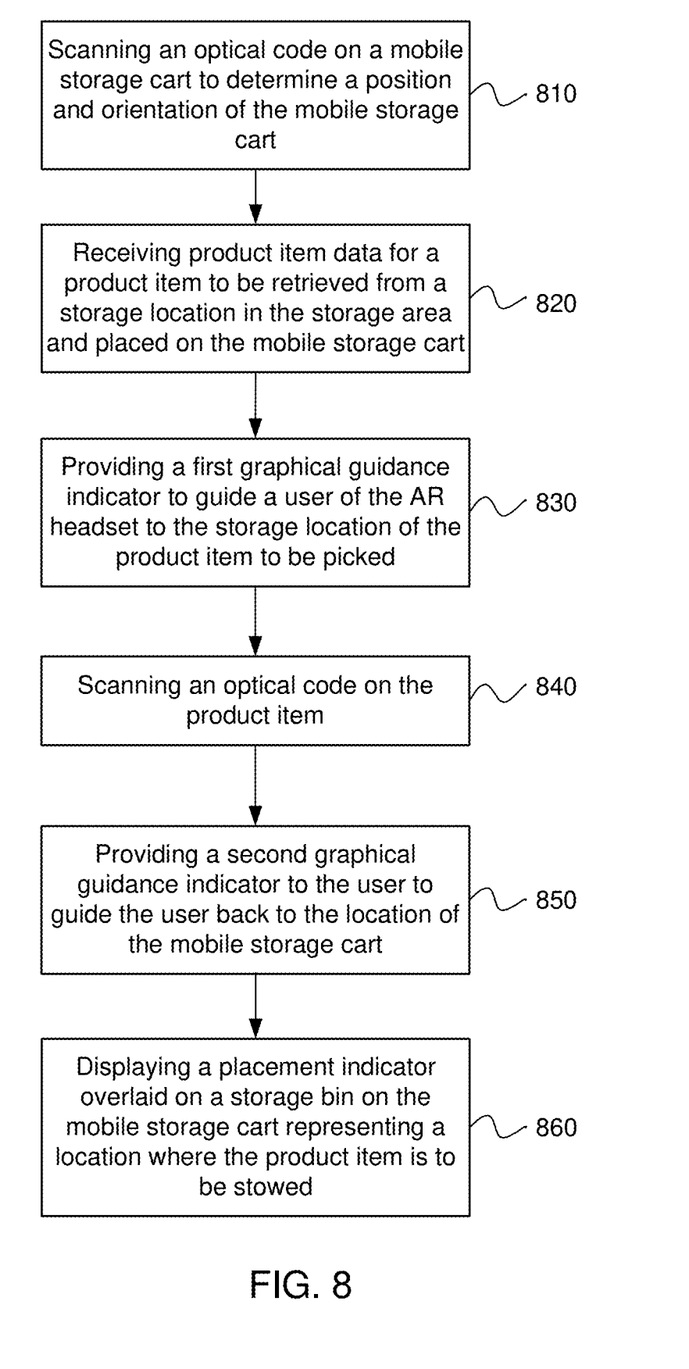
FIG. 8 is a flow chart illustrating an example of a method for picking product items within a storage area using an AR headset.

FIG. 8 is a block diagram illustrating a method for picking items within a storage area using an AR headset. The method may include scanning an optical code on a mobile storage cart to determine a position and orientation of the mobile storage cart, as in block 810. Another operation may be receiving item data for an item to be retrieved from a storage location in the storage area and placed on the mobile storage cart, as in block 820.

A first graphical guidance indicator to guide a user of the AR headset to the storage location of the item to be picked may also be presented, as in block 830. A location of the AR headset within the storage area is known using sensors associated with the AR headset. The optical code on the item may then be scanned as in block 840. A second graphical guidance indicator can be presented to the user to guide the user back to the location of the mobile storage cart, as in block 850. A placement indicator can be displayed as being overlaid on a storage bin on the mobile storage cart representing a location where the item is to be placed, as in block 860.

Figure 9:
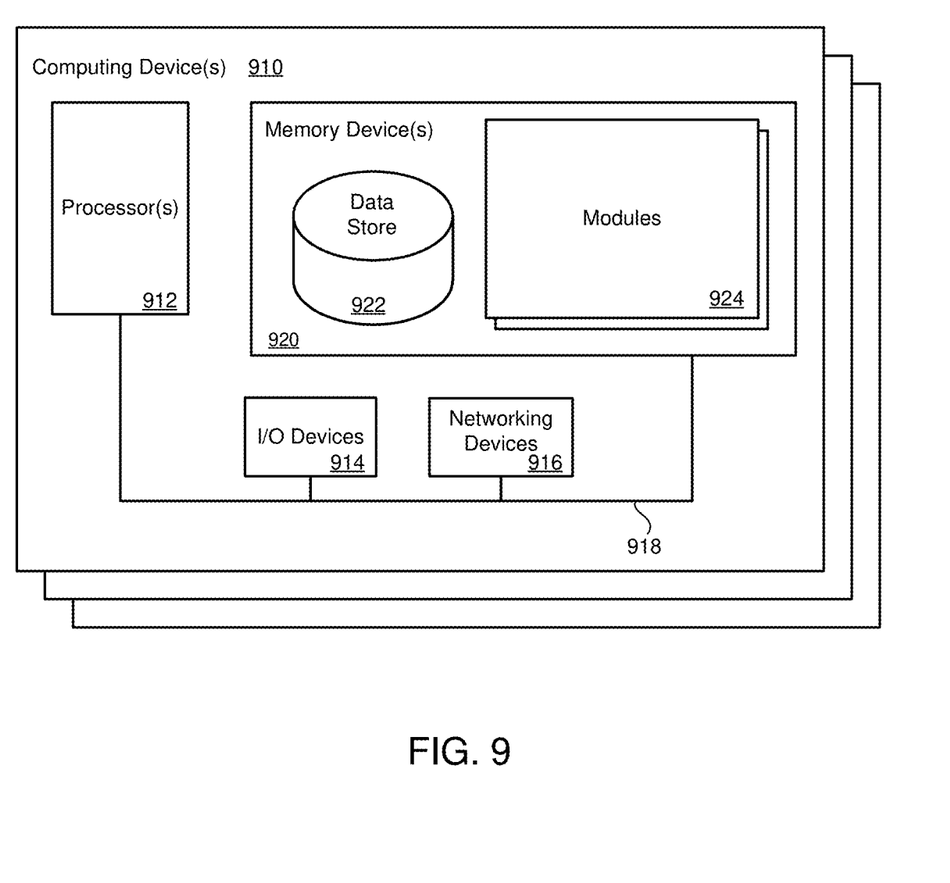
FIG. 9 illustrates a computing device on which modules of this technology may execute.

FIG. 9 illustrates a computing device 910 on which modules or layers of this technology may execute. A computing device 910 is illustrated on which a high-level example of the technology may be executed. The computing device 910 may include one or more processors 912 that are in communication with memory devices 920. The computing device may include a local interface 918 for communication with the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher-level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid-state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for picking items within a storage area using an AR headset, comprising:
    scanning an optical code on a mobile storage cart to determine a position and orientation of the mobile storage cart;
    receiving item data for an item to be retrieved from a storage location in the storage area and placed on the mobile storage cart;
    providing a first graphical guidance indicator to guide a user of the AR headset to the storage location of the item to be picked;
    scanning the optical code on the item; and
    displaying a placement indicator overlaid on a location on the mobile storage cart representing the location where the item is to be placed.

2. The method as in claim 1, further comprising displaying the placement indicator overlaid on the location that is a storage bin on the mobile storage cart.

3. The method as in claim 2, further comprising displaying the placement indicator using the AR headset such that the placement indicator appears to be on a bottom of the storage bin located on the mobile storage cart.

4. The method as in claim 1, further comprising providing the first graphical guidance indicator that is one or more arrows displayed to the user to guide the user to the storage location of the item or to guide the user back to the mobile storage cart.

5. The method as in claim 1, further comprising providing a second graphical guidance indicator to guide the user back to the mobile storage cart.

6. The method as in claim 5, further comprising providing the second graphical guidance indicator that is one or more arrows displayed to the user to guide the user back to the mobile storage cart.

7. The method as in claim 1, further comprising displaying a graphical overlay that appears to be on a storage bin and recording that the item has been correctly placed when a hand of the user is in proximity to the graphical overlay.

8. The method as in claim 1, further comprising displaying a graphical geometric object that is in a path to the storage location to the item and recording that the item has been correctly picked when a hand of the user passes through the graphical geometric object in a 3D coordinate system of the AR headset.

9. A method for placing items to storage locations using an AR headset, comprising:
    scanning an optical code on a mobile storage cart to determine a position and orientation of the mobile storage cart;
    identifying a location of an item to be moved from the mobile storage cart, using a graphical overlay on the location of the mobile storage cart;
    scanning the optical code of the item from the mobile storage cart;
    providing a graphical guidance indicator to guide a user of the AR headset to a storage location for the item to be placed;
    displaying a placement indicator overlaid on the storage location representing where the item is to be placed; and
    determining that a user's hand is in proximity to the storage location to detect that placement of the item is complete.

10. The method as in claim 9, further comprising providing a second graphical guidance indicator with at least one arrow to guide the user back to the mobile storage cart.

11. The method as in claim 9, further comprising:
    displaying a second graphical overlay that is overlaid on the storage location; and
    recording that the item has been correctly placed when the user's hand is in proximity of the second graphical overlay.

12. The method as in claim 9, further comprising displaying a graphical geometric object at the storage location and recording that the item has been correctly placed when the user's hand passes through the graphical geometric object viewable in a 3D coordinate system of the AR headset.

13. The method as in claim 9, further comprising displaying the graphical overlay on the location on the mobile storage cart that is a storage bin.

14. The method as in claim 9, further comprising displaying the placement indicator overlaid on the storage location so that it appears to be on a shelf of the storage location.

15. The method as in claim 9, further comprising displaying the placement indicator using the AR headset such that the placement indicator appears to be on a front or a bottom of a storage bin at the storage location.

16. A system for scanning an optical code using an augmented reality (AR) headset, comprising:
    at least one processor;
    a memory device including instructions that, when executed by the at least one processor, cause the system to:
    scan the optical code on a mobile storage cart to determine a position and orientation of the mobile storage cart;
    receive item data for an item to be retrieved from a storage location and placed on the mobile storage cart;

provide a first graphical guidance indicator to guide a user of the AR headset to the storage location of the item to be picked, wherein a location of the AR headset within a storage area is known using sensors associated with the AR headset;

scan the optical code on the item;

provide a second graphical guidance indicator to the user to guide the user back to the location of the mobile storage cart; and display a placement indicator overlaid on a storage bin on the mobile storage cart representing the location where the item is to be placed.

17. The system as in claim 16, further comprising:

displaying the placement indicator using the AR headset such that the placement indicator appears to be on a bottom of the storage bin located on the mobile storage cart.

18. The system as in claim 16, further comprising providing the first graphical guidance indicator and the second graphical guidance indicator that are one or more arrows displayed to the user to guide the user to the storage location of the item or to guide the user back to the mobile storage cart.

19. The system as in claim 16, further comprising displaying a graphical overlay that appears to be on the storage bin and recording that the item has been correctly placed when a hand of the user is in proximity to the graphical overlay.

20. The system as in claim 16, further comprising displaying a graphical geometric object that is in a path to the storage location to the item and recording that the item has been correctly picked when a hand of the user passes through the graphical geometric object in a 3D coordinate system of the AR headset.

* * * * *